June 30, 1959     C. H. HARRIS ET AL     2,892,392
CAMERA
Filed Dec. 30, 1953     4 Sheets-Sheet 1
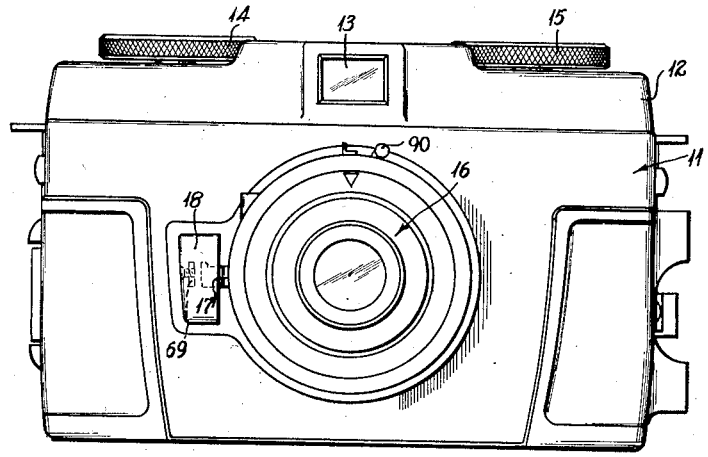
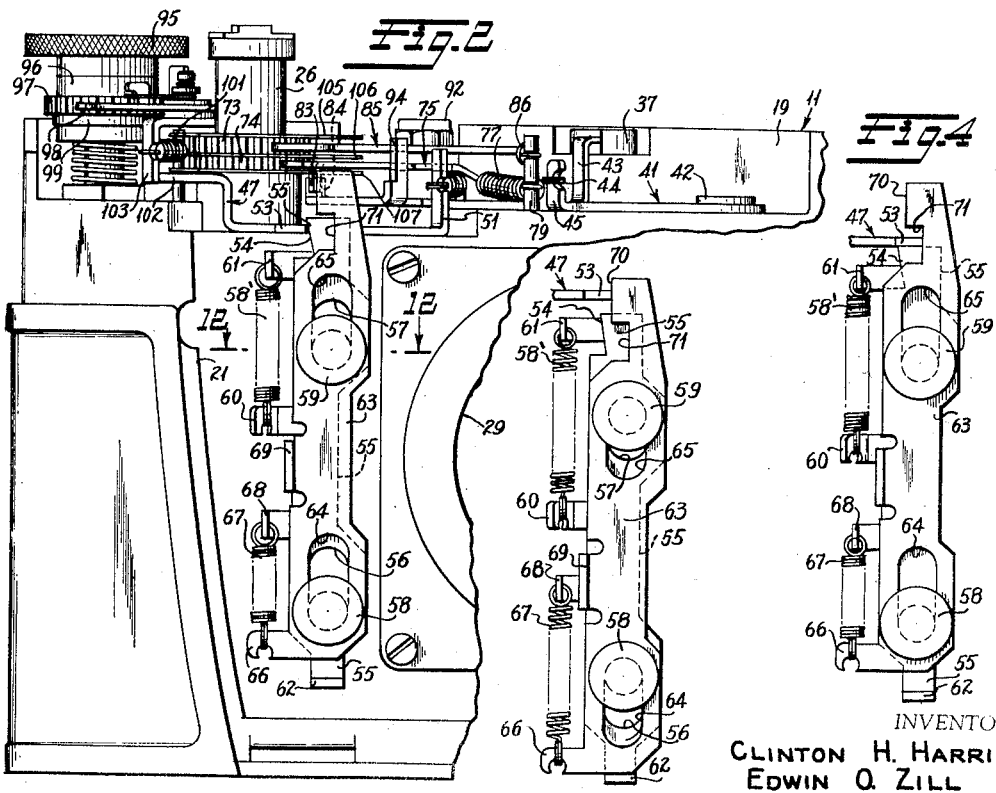
INVENTORS
CLINTON H. HARRIS
EDWIN O. ZILL
BY
Strauch, Nolan & Diggins
ATTORNEYS

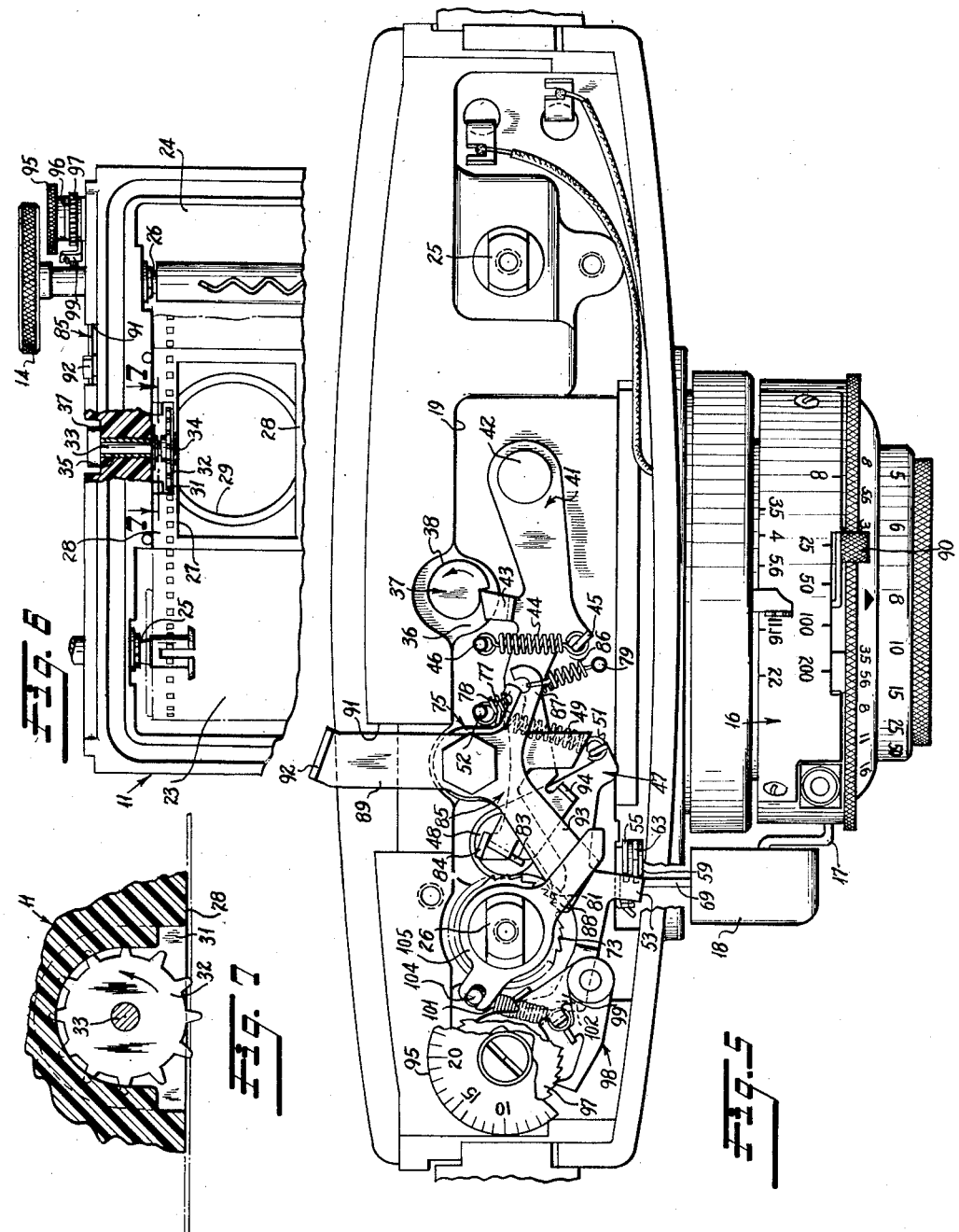

June 30, 1959   C. H. HARRIS ET AL   2,892,392
CAMERA
Filed Dec. 30, 1953   4 Sheets-Sheet 3
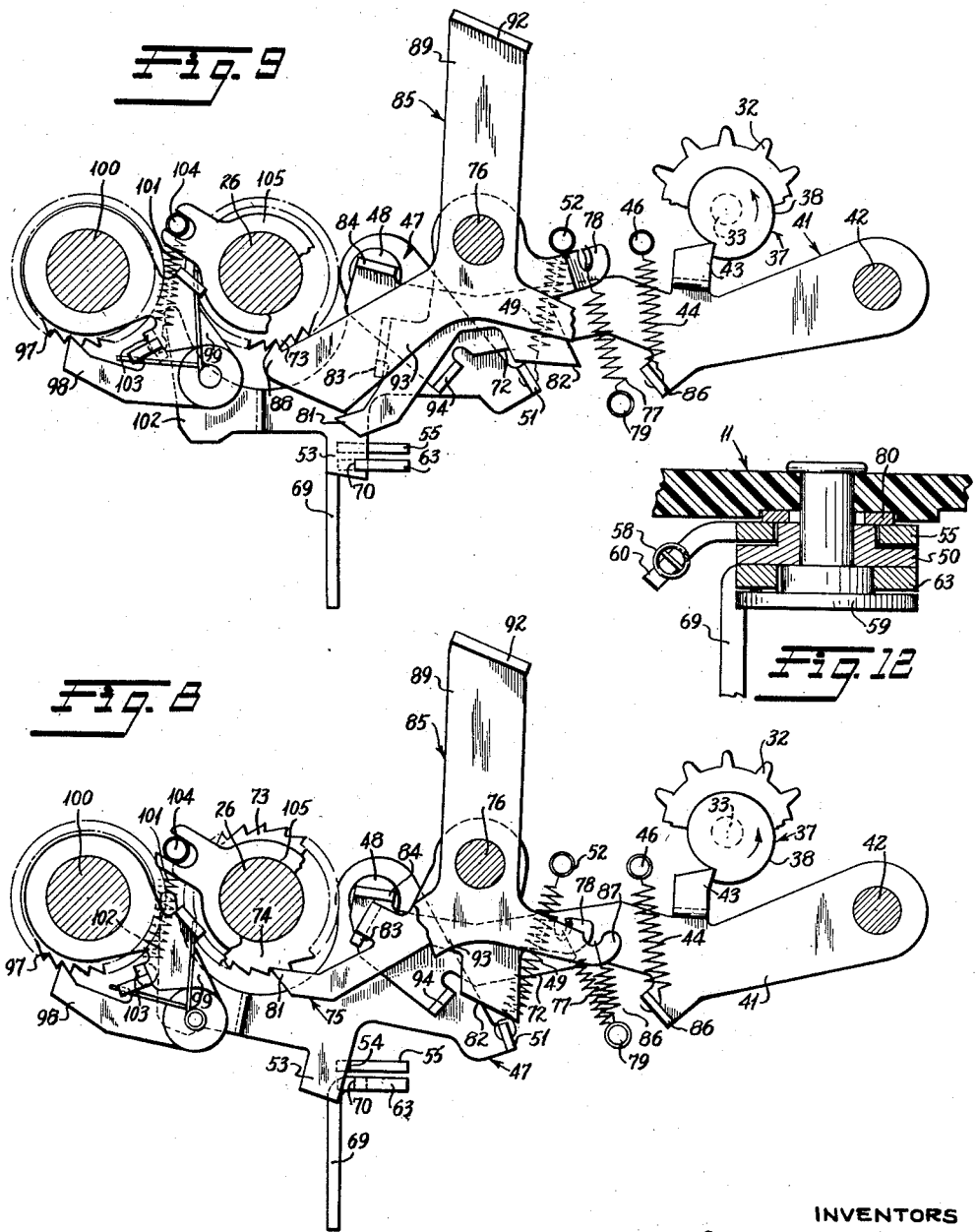
INVENTORS
CLINTON H. HARRIS
EDWIN O. ZILL
BY
*Strauch, Nolan + Diggins*
ATTORNEYS

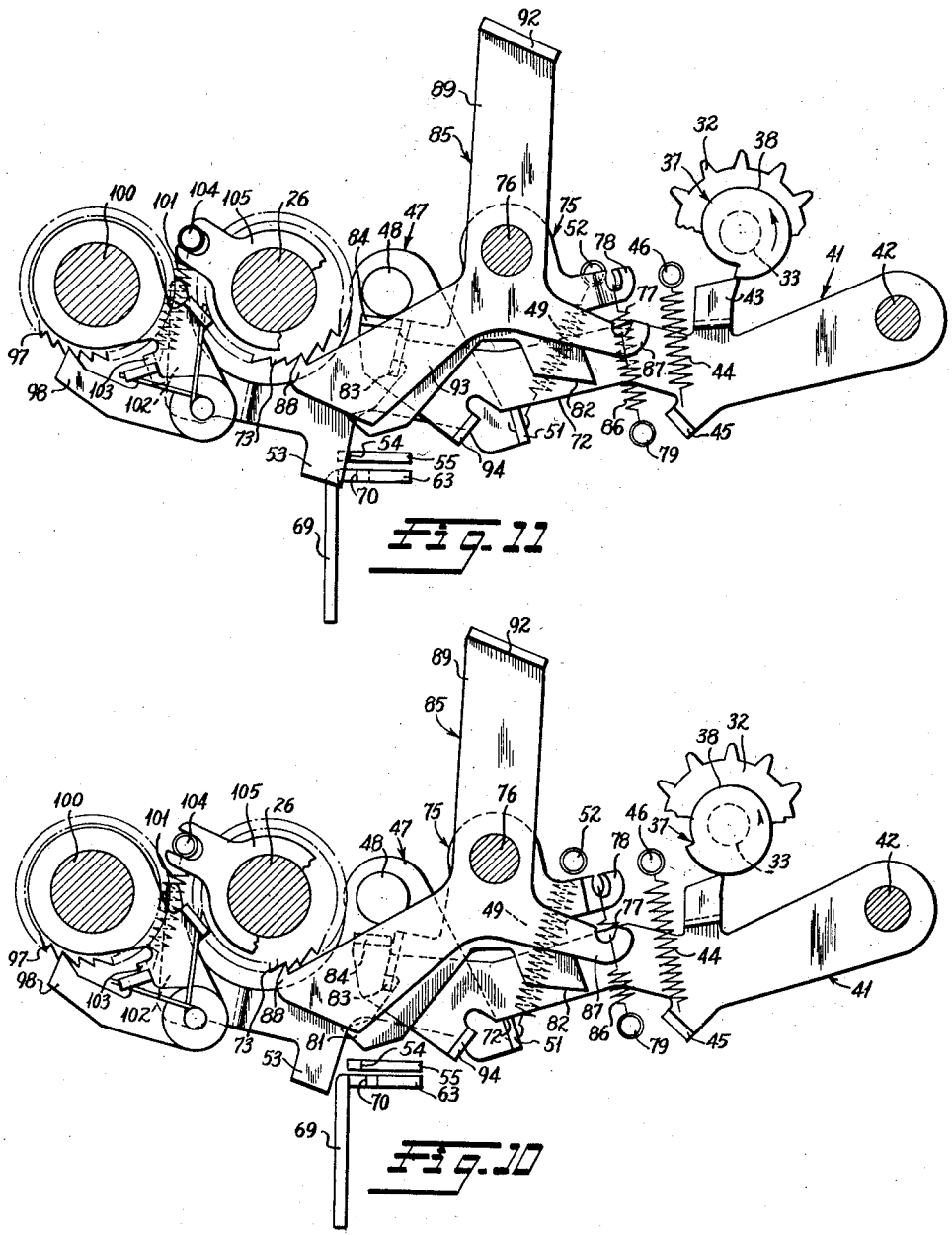

United States Patent Office 2,892,392
Patented June 30, 1959

2,892,392
CAMERA

Clinton H. Harris and Edwin O. Zill, Ann Arbor, Mich., assignors, by mesne assignments, to Sylvania Electric Products Inc., New York, N.Y., a corporation of Massachusetts Application December 30, 1953, Serial No. 401,115

12 Claims. (Cl. 95—31)

This invention relates to cameras and is particularly concerned with exposure and film wind control mechanism for cameras.

It is the major object of the present invention to provide an exposure control mechanism in cameras wherein the film winding and shutter actuating mechanism are interrelated in a novel manner to prevent undesired double exposures and also to prevent wasting unexposed film areas in the event the operator forgets whether he has advanced the film after making an exposure.

It is a further object of our invention to provide a novel shutter control latch which is actuated by advance of the film.

A further object of the invention is to provide a novel camera wherein the body is provided with associated top and front recesses containing the shutter and film wind control mechanism.

A further object of the invention is to provide a novel shutter and film wind interlock.

It is a further object of the invention to provide a shutter and film wind interlock having a novel intentional double exposure enabling mechanism.

A further object of the invention is to provide a counter actuating mechanism having novel coaction with the exposure control mechanism in a camera.

Further objects of the invention will appear as the description proceeds in connection with the appended claims and the annexed drawings wherein:

Figure 1 is a front view of a camera containing a preferred embodiment of the invention;

Figure 2 is an enlarged fragmentary front elevation of part of the camera body broken away to show details of the exposure and film wind control mechanism;

Figures 3 and 4 are fragmentary views illustrating different positions of the shutter attached controls of Figure 2;

Figure 5 is an enlarged top plan of the camera with the top body section removed to illustrate details of the control mechanism..

Figure 6 is a fragmentary rear elevation of the camera partially broken away and in section to illustrate mainly the sprocket control cam;

Figure 7 is an enlarged fragmentary view taken on line 7—7 of Figure 6 showing the film guide and sprocket relation; and Figures 8, 9, 10 and 11 illustrate different operative positions of the exposure and film wind control mechanism during different periods of operation of the camera; and Figure 12 is an enlarged fragmentary sectional view taken on line 12—12 of Figure 2.

Referring to Figure 1, the camera comprises a body 11 having a removable top section 12. The top section houses the usual view finder indicated at 13 and through it extend the spindles terminating in take-up wind knob 14 and rewind knob 15. A conventional shutter and lens assembly 16 is mounted on the front wall of body 11, this preferably being the usual Compur type assembly wherein the shutter is disposed between front and rear lens elements, cocked by one lever 90 and tripped by a laterally projecting separate shutter lever 17 having a manual button 18 on its outer end. Downward displacement of button 18 causes an exposure making operation of the shutter, and the button is spring returned after release by the operator as will appear.

The top wall of the main body section 11 is recessed at 19 to receive part of the exposure control mechanism, and the front wall of the body molding is recessed at 21 to receive associated exposure control mechanism as will appear.

Referring first to Figure 6, which shows the rear of the camera with the back removed, body 11 is formed at opposite ends with chambers of substantially equal size 23 and 24 into which extend respectively spindles 25 and 26 for the film supply and take-up spools. Intermediate chambers 23 and 24, the body is formed with a chamber 27 which at the back of the camera is rectangular and bounded on opposite sides of a shallow film track depression 28. At the front of the camera, chamber 27 opens to provide the exposure aperture 29 through which light comes from the lens assembly to expose the film passing over the track 28.

The aperture 29 is centered in the camera, and one side of the film track 28 is apertured at 31 as illustrated in Figures 6 and 7 to accommodate sprocket wheel 32 mounted on a shaft 33 which is journalled in bearings 34 and 35 so as to be freely rotatable upon an axis which is perpendicular to the optical axis and perpendicular to the plane of the film passing along track 28 from the supply spool in chamber 23 to the take-up spool in chamber 24. The outer end of sprocket shaft 33 extends through a boss 36 in the body (Figure 5) and has non-rotatably fixed thereto a cam 37 which, as illustrated in Figure 5, has a surface 38 of constant lift the function of which will be later described in terms of its association with the exposure control mechanism illustrated in Figures 3–5 and 8–11.

Thus, as the film is drawn over the film track 28 in which it is held in a plane by the usual resilient film pressure plate on the removable back (not shown) of the camera, it rotates the freely mounted sprocket 32 by virtue of engagement with the sprocket tooth which normally always projects above the plane of the film track as shown in Figure 7 and thereby rotates the cam 37 through a predetermined angular amount every time the film is advanced the distance of one frame past the exposure aperture, this being independent of the amount of film on either spool.

A release lever 41 is mounted within recess 19 for free rotation about a fixed pivot indicated at 42. This lever extends from right to left in Figure 5 and is formed with an upstanding lug 43 which functions as a follower for cam surface 38 against which it is constantly maintained by the pull of a coiled tension spring 44 which extends between an upstanding tab 45 on lever 41 and an anchor 46 on the camera body. Thus, referring to Figure 5, the release lever 41 is constantly biased in a clockwise direction to maintain contact with cam 37 and when the film is advanced from the supply spool chamber 23 to the take up spool in chamber 24, thereby rotating sprocket 32 and cam 37 in a counterclockwise direction as shown in Figure 5, such will cause counterclockwise rotation of release lever 41 about its pivot 42 against the force of spring 44 for a purpose to be described.

A latch lever 47 is rotatably mounted to turn in a plane below the plane of release lever 41 about a fixed pivot 48. A spring 49 extending between an upstanding lug 51 on latch 47 and an anchor 52 on the body constantly biases latch 47 to turn in a counterclockwise direction against the force of spring 49. Latch lever 47 is provided with a locking projection 53 which extends forwardly into recess 21 in the front wall of the camera.

Referring now to Figure 2, which like Figure 8 shows the parts in the position they occupy after the film has been advanced one frame and is ready for an exposure making operation, latch lever 47 is held in its displaced non-latching position by the fact that locking projection 53 engages the edge face 54 of a rear slider bar 55 which is slidably mounted by means of elongated slots 56 and 57 on fixed studs 58 and 59 for reciprocal displacement in a plane perpendicular to the plane of swing of latch 47. A coiled tension spring 58' extending between tab 60 on bar 55 and an anchor 61 on the body constantly urges slider bar 55 upwardly in Figure 2. The lower end of bar 55 is bent at right angles forwardly out of the plane of Figure 2 to provide a foot 62 for a purpose to be described.

A front slider bar 63 is superposed above slider bar 55 for parallel reciprocal displacement, being formed with elongated slots 64 and 65 coacting with studs 58 and 59 and a lower tab 66 connected by coiled tension spring 67 to a fixed anchor 68 on the body. Spring 67 contstantly urges front slider bar 63 upwardly to its Figure 2 position. An integral lug 69 projects forwardly from front slider bar 63 and at its outer end has fixedly mounted thereon the manual button 18 which is operably connected to shutter lever 17. The foot 62 at the lower end of bar 55 lies in the path of the lower end of bar 63.

The preferable stud construction is shown at Figure 12 wherein each stud mounts a bushing 50 which effectively spaces bars 55 and 63 and reduces friction of the relatively moving parts. Anchors 61 and 68 are integral with a strap 80 fixed to the camera body. Thus bar 55 is slidable in a guide between strap 80 and bushing 50, and bar 63 is slidable in a guide between bushing 50 and the head of the stud.

Thus when the operator pushes down on button 18 such displaces lever 17 to actuate the shutter to perform an exposure making operation and displaces slider bar 63 downwardly. At its upper end slider bar 63 is formed with a side edge notch 71 which under certain circumstances of operation to be described later is adapted to receive latch projection 53 to prevent downward displacement of slider bar 63 by the operator pushing on button 18 and thereby prevent actuation of the shutter. Above notch 71 is an edge face 70 also adapted to coact with the latch as will appear.

Figures 4 and 9 illustrate the parts in the position they assume after the shutter has been tripped and ready for the operator to advance the film. Cam 37 is rotated counterclockwise by rotation of sprocket 32 during advance of the film toward the take-up spool in chamber 24 and release lever 41 is thereby rocked counterclockwise due to sliding contact of follower lug 43 with the cam. This first brings edge face 72 of lever 41 into contact with lug 51 of the latch lever 47 (see Figure 10), and further counterclockwise rocking of lever 41 with edge face 72 in sliding contact with lug 51 results in a clockwise rocking of latch lever 47 about its pivot 48 which removes latch projection 53 from notch 71 and out of the path of rear slider bar 55. As soon as projection 53 clears bar 55, spring 58' shifts rear slider bar 55 upwardly to its Figure 2 position and this takes place before the cam has rotated a complete revolution.

After cam 37 has been rotated a complete revolution, lug 43 drops from the high point of surface 38 shown in Figure 11 to the low point position of Figure 5, thereby permitting release lever 41 to rock back to its Figure 5 position under the pull of spring 44 and freeing latch lever 47 to be rocked back counterclockwise under the influence of spring 49. However, by this time slider bar 55 is so disposed as in Figure 2 that its edge face 54 is in the path of latch projection 53 and this holds the latch 47 in its rocked Figure 5 position.

Within body recess 19 take-up spindle 26 which is freely rotatably mounted in the camera body has fixed thereon two oppositely toothed ratchet discs 73 and 74. A wind pawl 75 is mounted for free rocking on a fixed pivot 76 within the recess 19 above the planes of levers 41 and 47 about an axis parallel to spindle 26. A coiled tension spring 77 extending between a tab 78 on pawl 75 and an anchor post 79 on the camera body normally urges pawl 75 clockwise to tend to engage pawl tooth 81 with the teeth of the lower ratchet disc 74 as illustrated in Figure 8.

However, when the parts are in the above described Figure 4 and 9 position, wind pawl 75 is held rocked counterclockwise so that tooth 81 is disengaged from the ratchet disc 74, by reason of engagement of face 82 of the wind pawl with lug 51 of the latch lever.

During the above described rotation of cam 37 by film advance, starting with the parts in Figure 9 position, lug 51 moves away from pawl face 82 as soon as the latch lever 47 starts to rock clockwise, but pawl 75 which would otherwise be free to rock clockwise to engage ratchet disc 74 has a downturned lug 83 which is now engaged by an upturned lug 84 on the end of release lever 41 which now assumes control of the wind pawl 75 and holds the wind pawl out of engagement with ratchet disc 74 until the film winding operation to advance the film one frame is completed. Then the clockwise return of release lever 41 to its initial position of Figures 5 and 8 disengages lug 83 from the wind pawl and permits spring 77 to rock the wind pawl into toothed engagement with the ratchet disc 74 as illustrated in Figure 8. This locks the spindle 26 to prevent further winding of knob 14 and thus limits the film advance to one frame.

After the film advance movement has been completed, the shutter is cocked through the usual separate cocking lever 90, which has no connection with the mechanism in recesses 19 and 21 and the camera is now ready for an exposure by displacing button 18 downward. At this time the slider bars 55 and 63 and the latch lever are related as in Figure 2.

When button 18 is pushed downwardly to actuate shutter lever 17, bar 63 engages foot 62 of the rear slider bar 55 and displaces bar 55 downward until face 54 is removed from the path of latch projection 53. Now latch 47 tends to rock back counterclockwise under the pull of spring 49, but as long as front slider bar 63 is in its lowered position its edge face 70 will block such counterclockwise swinging of the latch lever, a transient condition of the parts illustrated in Figure 3. The relative locations of edge faces 54 and 70 and the proportions of the slider bars are such that edge face 70 moves into the path of latch projection 53 before edge face 54 is removed out of the path of latch projection 53. Also since face 70 is slightly displaced laterally of face 54 it will be observed that projection 53 in its Figure 3 position engaging face 70 now extends over the top of rear slider bar 55.

Thus the spindle 26 is maintained against rotation during the entire shutter actuating operation. However, when the operator releases button 18, this permits spring 67 to pull front slider bar 63 upwardly and at the same time spring 58' tends to pull rear slider bar 55 upwardly. As soon as blocking face 70 rises above latch projection 53, the spring biased latch 47 now is permitted by notch 71 to swing counterclockwise to its Figure 4 and 9 position to coact with the mechanism in recess 19 as above explained but latch projection 53, as shown in Figure 4, remains in the path of the top of rear slider bar 55 to prevent its upward displacement by spring 58'. In this position of the parts, the shutter cannot be actuated, due to the latching engagement of projection 53 in notch 71, until the film has been advanced as above described to swing latch lever 47 to its Figure 2 position. Thus unintentional double exposures are prevented.

Above the plane of wind pawl 75, a rewind pawl 85 is mounted for free rocking about pivot 76, and a coiled tension spring 86 acting between arm 87 of the rewind pawl and anchor post 79 constantly urges pawl 85 clockwise (Figure 5) to enage tooth 88 with upper ratchet disc 73 on take-up spindle 26. Pawl 85 has an operating arm 89 which projects rearwardly of the body through a recess 91 and is formed with a manual handle tip 92 accessible to the operator outside the camera.

During all normal operation of the camera pawl 85 is resiliently maintained engaged with ratchet disc 73 to permit only unidirectional counterclockwise rotation of take-up spindle 26 even when wind pawl 75 is disengaged from ratchet disc 74. When it is desired to rewind the film on the supply spool on spindle 25 the operator merely grasps arm 89 and rocks pawl 85 counterclockwise to swing tooth 88 away from the ratchet disc 73. During this movement, arm 93 of pawl 85 engages an upturned lug 94 on release lever 41 and rocks lever 41 counterclockwise to remove lug 43 from engagement with cam 37 and, if wind pawl 75 should be in toothed engagement with ratchet disc 74 at the time, engagement of lug 84 with the wind pawl lug 83 will swing wind pawl 75 also out of toothed engagement with ratchet disc 74, and spindle 26 will now be free to rotate under the pull of the film being rewound on the spool on spindle 25. The rocking of lever 41 counterclockwise by pawl 85 results in clockwise rocking of latch 47, by engagement of face 72 and lug 52, whereby the slide bars in recess 21 are unlatched to permit an intentional double exposure. It will be observed that the action of pawl 85 in rocking lever 41 until follower lug 43 is out of the path of the cam 37 permits free reverse rotation of the sprocket and cam assembly by the rewound film. Pawl 85 is spring returned to its normal Figure 5 position when released by the operator.

A counter dial 95 visible through the top of the camera is mounted on a rotatable supporting shaft through the usual friction clutch indicated at 96 and it is rotated by means of a ratchet disc 97 engaged by a spring biased pawl 98. Pawl 98 is pivotally mounted on a carrier 99 which is in turn pivotally mounted to rock about the axis of the counter shaft but is normally pulled counterclockwise by a coiled tension spring 101 anchored on body pin 104. The carrier is caused to rock clockwise about the axis of the counter shaft 100 every time a film advancing operation is effected, the actual displacement of carrier 99 being effected by an integral nose 102 on latch lever 47 in slidable contact with a downturned lug 103 (Figure 2) on carrier 99, when the latch lever 47 is being moved clockwise by the release lever as above explained. Latch lever nose 102 serves as a stop against counterclockwise rocking of carrier 99 by spring 101. Pawl 98, when the carrier is thus rocked clockwise, turns ratchet disc 97 and the dial clockwise. When the latch lever moves in the opposite direction, spring 101 effects return rocking of the carrier, pawl 98 merely ratcheting over disc 97 at the time.

A plurality of spacer elements 105, 106 and 107 are provided about the spindle 26 as illustrated to maintain planar swinging of pawls 75 and 85 and these are anchored against rotation by slotted end engagement with anchor 104.

We have therefore provided a camera in which double exposures and undue waste of film are avoided through a novel film wind and shutter interlock. Double or multiple exposures may be deliberately made by manipulation of rewind pawl 85.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a camera having a film wind spindle and a sprocket adapted to be rotated by film advanced through the camera toward said spindle, a cam rotated by said sprocket, a pivoted release lever resiliently biased against said cam so as to be rocked by rotation of said cam, a pivoted latch lever resiliently biased to rock oppositely to said release lever, a locking projection on said latch lever, a slidable shutter control bar having a notch adapted to receive said projection in one position of said latch, and means on said release lever adapted when the latter is rocked by rotation of said cam to engage and rock said latch lever to a position where said projection is removed from said notch.

2. In the camera defined in claim 1, a pivoted wind pawl spring biased in one direction to provide a toothed ratchet locking connection with said spindle, and means on said latch and release levers for operably coacting with said wind pawl for rendering said locking connection inoperative after the shutter has been actuated and until the film has been advanced a predetermined amount toward said spindle.

3. In a camera having a shutter actuating lever, two substantially superposed relatively reciprocable parallel members, one of said members being operably connected to said lever and having a notch adjacent its upper end, the other of said members having a stop face adjacent its upper end and a foot projection extending below the lower end of said one member, means resiliently biasing said members in the same direction, a latch pivoted on an axis normal to the direction of reciprocation of said members spring biased toward said members and having a locking projection adapted to be received in said notch overlying the upper end of said other member or engaged with said face of said other member in shutter locking and unlocked positions respectively of said latch, and means operated by advance of the film in the camera for shifting said latch against its spring bias.

4. In a camera, a body having a recess in its upper portion, a lens and shutter assembly removably mounted on its front wall and a front wall recess extending from the upper recess alongside the lens and shutter assembly, a compound slide bar assembly in said front wall recess operably connected to said shutter assembly and extending to said upper recess, a film wind spindle projecting into said upper recess, a cam in said upper recess adapted to be rotated by advance of the film through the camera, and a system of associated motion transmitting levers pivoted on parallel axes within said upper recess, one of said levers being a cam follower and another being adapted for toothed ratchet locking connection to said spindle, and a latch for said slide bar assembly movably mounted on said body and operably connected between said slide bar assembly and said system of pivoted levers so that said latch is disabled with respect to said slide bar assembly when said film has been advanced a predetermined length and moved to lock said slide bar assembly against further exposure making movement after each exposure making movement thereof.

5. In a camera, a film wind spindle having a row of ratchet teeth, a pivoted pawl spring biased toward toothed engagement with said ratchet, a pivoted release lever spring biased in one direction and adapted to be rocked in the other direction by means responsive to advance of the film through the camera, a pivoted latch lever spring biased oppositely to said release lever, means for operatively interconnecting said latch and release levers for rocking said latch lever from an initial position toward a predetermined position when the release lever is rocked by advance of the film and for operatively disengaging said latch and release levers after the film has advanced a predetermined distance, a shutter actuating means having a first position where it is disposed in the path of said latch lever to prevent spring return of the latter after disengagement from said release lever and a second position where it permits said spring return of said latch lever, said returned latch lever locking said shutter actuating means in said second position to then prevent operation of the shutter, and means on said latch lever engaging said wind pawl and holding it disengaged from said spindle ratchet while the latch lever is in its initial position but permitting spring movement of said pawl to locking engagement with said spindle ratchet when said latch lever is in its said predetermined position.

6. In a camera, a film wind spindle having two rows of oppositely directed ratchet teeth, a spring biased pivoted wind pawl and a spring biased rewind pawl both normally engaged with said respective ratchet teeth, a spring biased lever, said lever being pivoted on the camera in spaced relation to the pivot of said wind pawl, a cam rotated by advance of the film toward said spindle for rocking said lever against its spring bias, means on said lever for engaging said wind pawl and holding it away from association with said spindle, an operating arm on said rewind pawl, means on said lever directly engaged by said rewind pawl whereby rocking of said rewind pawl away from said spindle effects rocking of said lever away from said cam and also rocking of said wind pawl away from association with said spindle should it be associated with said spindle at the time, shutter actuating mechanism, and a latch lever for operable connection between said shutter actuating mechanism and said wind pawl for double exposure prevention.

7. In a camera, a film counter, a wind spindle and a shutter, control mechanism interlocked between the spindle and shutter for preventing two successive exposure making actuations of the shutter without an intermediate advance of a predetermined length of film and for preventing advance of more than said predetermined length of film after each shutter actuation comprising a pivoted release lever, means actuated by advance of the film for rocking said lever in a predetermined direction, shutter actuating means, a pivoted latch lever adapted in one position to lock said shutter actuating means, spindle locking and release means controlled by said release lever and latch lever cooperating means on said release lever and latch lever for swinging said latch lever out of locking relationship with said shutter actuating means when said release lever is rocked in said predetermined direction, and a uni-directional drive connection between said latch lever and said counter for actuating the counter when said latch lever is swung to unlock said shutter actuating means.

8. In a camera, a rotatable film wind spindle, a spindle locking member shiftable between spindle locked and spindle unlocked positions, a movable shutter control member, a movable latch adapted in one position to lock said shutter control member against exposure making movement and to engage said spindle locking member to maintain the latter in spindle unlocked position, cam means rotated by advance of a film through said camera toward said spindle, a lever operably connected to be moved by rotation of said cam means, means on said lever operably engaging said latch to move the latch to unlock said shutter control member for exposure making movement, said latch movement also operably disengaging the latch from said spindle locking member, means on said lever effective when said latch is operably disconnected from said spindle locking member for engaging and retaining said spindle locking member in unlocked position, means operable after predetermined rotation of said cam means to move said lever to release said spindle locking member, and means operable upon such release of said spindle locking member to shift said spindle locking member into spindle locked position.

9. In the camera defined in claim 8, a counter mechanism and a unidirectional drive for said counter mechanism operably coupled to said latch.

10. In a camera, a wind spindle, a wind pawl normally biased into engagement with said spindle to lock it against rotation in one direction, a cam rotated by advance of a film through the camera toward said spindle, a pivoted level operably connected to be gradually rocked in one direction by said cam, a slidable shutter control member in said camera, a pivoted shutter control latch adapted in one position to engage and lock said shutter control member against exposure making movement, said latch in said one position also engaging said wind pawl to maintain the latter out of locking engagement with said spindle, coacting means on said lever and latch for moving said latch for disengaging said latch from said shutter control member during said cam controlled rocking of said lever, said latch thereby being also moved out of engagement with said wind pawl, means on said lever effective upon said latch movement to engage said wind pawl and retain it out of locking engagement with said spindle, and means operable after predetermined rotation of said cam for oppositely rocking said lever and moving said wind pawl into locking engagement with said spindle.

11. In a camera, a shutter assembly having an actuating member, a first reciprocal slide bar connected to said member, a second relatively reciprocal slide bar adjacent said first slide bar, spring means biasing said bars in the same direction, a spring biased latch pivoted on an axis at right angles to the direction of slide of said bars, a notch in one of said bars adapted to receive said latch, a first stop face on said first bar adapted to be engaged by said latch, a second stop face on the other of said bars adapted to be engaged by said latch, coacting means on said bars whereby said bars are operably connected to slide together during exposure making shutter actuating movement of said first bar, said first and second stop faces being so located as to successively engage and maintain said latch against appreciable movement during said movement of said bars, and said latch upon spring return of said first bar being adapted to swing into said notch and overlie the upper end of said second bar whereby shutter actuating movement of said first bar and spring return of the second bar are prevented, and means responsive to advance of film for moving said latch out of said notch and permitting spring return of said second bar to a position where it disposes said second stop face in the path of said latch to prevent said latch from reentering said notch.

12. In a camera, a wind spindle, a film driven sprocket, a cam rotated from said sprocket, a pivoted exposure mechanism control lever spring biased into engagement with said cam, a pivoted rewind pawl spring biased toward engagement with said spindle to prevent rotation thereof in one direction, a pivoted wind pawl spring biased toward engagement with said spindle to prevent rotation thereof in the opposite direction, a pivoted latch lever, shutter actuating mechanism, spring means biasing said latch lever in one direction to dispose one portion thereof in locking association with said shutter actuating mechanism and another portion thereof in engagement with said wind pawl to hold the wind pawl disengaged from said spindle, means operatively connecting said control lever and latch lever during movement of the control lever by said cam from an initial position as the film is advanced to unlock said latch from said shutter actuating mechanism and disengage said latch from said wind pawl for spring biased return toward locking engagement with said spindle, said control lever being returned to initial position after a complete revolution of said cam, and cooperating means on said control lever and wind pawl effective after said disengagement of the latch lever and wind pawl for preventing locking engagement of the wind pawl with the spindle until after said revolution of the cam and return of the control lever substantially to said initial position.

References Cited in the file of this patent

UNITED STATES PATENTS

| | | |
|---|---|---|
| 2,398,412 | Crumrine | Apr. 16, 1946 |
| 2,559,880 | Kesel et al. | July 10, 1951 |
| 2,544,879 | Harvey et al. | May 13, 1951 |
| 2,632,369 | Estes | Mar. 24, 1953 |
| 2,663,234 | Hodges | Dec. 22, 1953 |
| 2,672,797 | Blattner | Mar. 23, 1954 |

FOREIGN PATENTS

| | | |
|---|---|---|
| 604,389 | Germany | Oct. 19, 1934 |
| 604,390 | Germany | Oct. 19, 1934 |